(12) United States Patent
Hess et al.

(10) Patent No.: US 10,487,644 B2
(45) Date of Patent: Nov. 26, 2019

(54) METHOD FOR HYDRAULIC COMMUNICATION WITH TARGET WELL FROM RELIEF WELL

(71) Applicant: Halliburton Energy Services, Inc, Houston, TX (US)

(72) Inventors: Joe E. Hess, Richmond, TX (US); Andy J. Cuthbert, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 139 days.

(21) Appl. No.: 15/502,858

(22) PCT Filed: Oct. 6, 2014

(86) PCT No.: PCT/US2014/059325
§ 371 (c)(1),
(2) Date: Feb. 9, 2017

(87) PCT Pub. No.: WO2016/057014
PCT Pub. Date: Apr. 14, 2016

(65) Prior Publication Data
US 2017/0248006 A1 Aug. 31, 2017

(51) Int. Cl.
*E21B 47/022* (2012.01)
*E21B 43/17* (2006.01)
(Continued)

(52) U.S. Cl.
CPC .......... *E21B 47/02216* (2013.01); *E21B 7/04* (2013.01); *E21B 43/17* (2013.01);
(Continued)

(58) Field of Classification Search
CPC .......... E21B 43/30; E21B 43/305; E21B 7/04; E21B 7/06; E21B 47/00; E21B 47/022; E21B 47/024; E21B 47/02216
See application file for complete search history.

(56) References Cited

U.S. PATENT DOCUMENTS 4,016,942 A 4/1977 Wallis, Jr. et al.
4,791,373 A 12/1988 Kuckes
(Continued)

OTHER PUBLICATIONS

Written Opinion issued for Singapore Patent Application No. 11201701186P, dated Apr. 19, 2018, 9 pages.
(Continued)

*Primary Examiner* — David Carroll (57) ABSTRACT

A system and method for establishing hydraulic communication between a relief well and a target well, wherein the relief well intersects with the target well at an intersection point and the relief well includes a distal portion of the relief well that is deviated and intersects the first wellbore from below the intersection point. A directional drilling system and a magnetic ranging system may be used to guide the relief well from a kick-off point to the intersection point. The deviation angle between the two intersecting wells is at least 45 degrees, but may be approximately 90 degrees or obtuse. A deviated portion of the relief well includes a J-shaped or U-shaped trajectory, thus allowing the wellhead of the relief well to be located at a site removed from the wellhead of the target well, but still intersect the target well at a shallow true vertical depth.

19 Claims, 7 Drawing Sheets

(51) Int. Cl.
*E21B 44/00* (2006.01)
*E21B 7/04* (2006.01)
*G01V 3/26* (2006.01)
*E21B 43/00* (2006.01)

(52) U.S. Cl.
CPC ............ *E21B 44/00* (2013.01); *E21B 47/022* (2013.01); *G01V 3/26* (2013.01); *E21B 43/006* (2013.01)

(56) References Cited

U.S. PATENT DOCUMENTS

| | | | |
|---|---|---|---|
| 5,074,360 A | | 12/1991 | Guinn |
| 5,074,365 A | * | 12/1991 | Kuckes ............ E21B 7/04 166/66.5 |
| 5,230,387 A | * | 7/1993 | Waters ............ E21B 7/068 175/45 |
| 7,878,270 B2 | | 2/2011 | Lee et al. |
| 2003/0217842 A1 | | 11/2003 | Zupanick et al. |
| 2004/0118611 A1 | * | 6/2004 | Runia ............ E21B 4/02 175/57 |
| 2010/0224415 A1 | | 9/2010 | Lee et al. |
| 2013/0037272 A1 | * | 2/2013 | Dale ............ E21B 21/00 166/363 |
| 2013/0118809 A1 | | 5/2013 | Veeningen |

OTHER PUBLICATIONS

International Search Report and The Written Opinion of the International Search Authority, or the Declaration, dated Jun. 23, 2015, PCT/US2014/059325, 16 pages, ISA/KR.

\* cited by examiner

METHOD FOR HYDRAULIC COMMUNICATION WITH TARGET WELL FROM RELIEF WELL

PRIORITY

The present application is a U.S. National Stage patent application of International Patent Application No. PCT/US2014/059325, filed on Oct. 6, 2014, the benefit of which is claimed and the disclosure of which is incorporated herein by reference in its entirety.

BACKGROUND

Technical Field

Embodiments disclosed herein relate to well relief operations in hydrocarbon exploration. In particular, embodiments disclosed herein relate to the development of hydraulic communication between a target and a relief well where the relief well intersects the target well from a trajectory that is perpendicular or below the intersection point with the target well.

Description of Related Art

In the field of hydrocarbon exploration and extraction, it is sometimes necessary to drill a relief well to provide a conduit for injecting a fluid, such as mud or cement, into a target well. Such procedures most often occur when the relief well is drilled in plug and abandon operations in order to kill a target well.

Typically, the drill site for a relief well is positioned at least 1000 feet from the drill site of the target well, although in some cases, the relief well drill site may be thousands of feet from the target well site. The relief well is typically drilled vertically down to a planned kickoff point, where the trajectory of the relief well is turned toward the target well using conventional directional drilling technology. Drilling is thereafter continued until the relief well intersects the target well along a trajectory extending from above the intersection point. To establish hydraulic communication between two wells at an intersection point, typically the deviation angle or angle of intercept is shallow, less than 15 degrees and most commonly approximately 6 degrees, in order to ensure that the bit or mill used to drill the relief well is not deflected off of the casing of the target well it being understood that the shallower the angle the greater opportunity for making the interception.

It will be appreciated that most wells in the oil and gas industry range from 10,000-30,000 feet or more. As such, there is sufficient vertical depth to position the drill site for a relief well 1000 or more feet from the drill site of the target well and still intercept the target well at a shallow deviation angle.

DETAILED DESCRIPTION

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Wellbore intersection for relief wells, coalbed methane drilling, wellbore re-entries for remediation, enhanced production, or plug and abandon operations can be achieved by utilizing a ranging system and directional drilling system to guide a relief wellbore to intersection with a target wellbore, where the deviation angle or angle of intercept is at least 45 degrees or where a portion of the relief wellbore drops below the point of intersect of the target wellbore. This allows intersection in cases where the intersection point on a target wellbore has a shallow true vertical depth that would otherwise be insufficient to allow intersection utilizing traditional methods and traditional well spacing.

Figure 1:
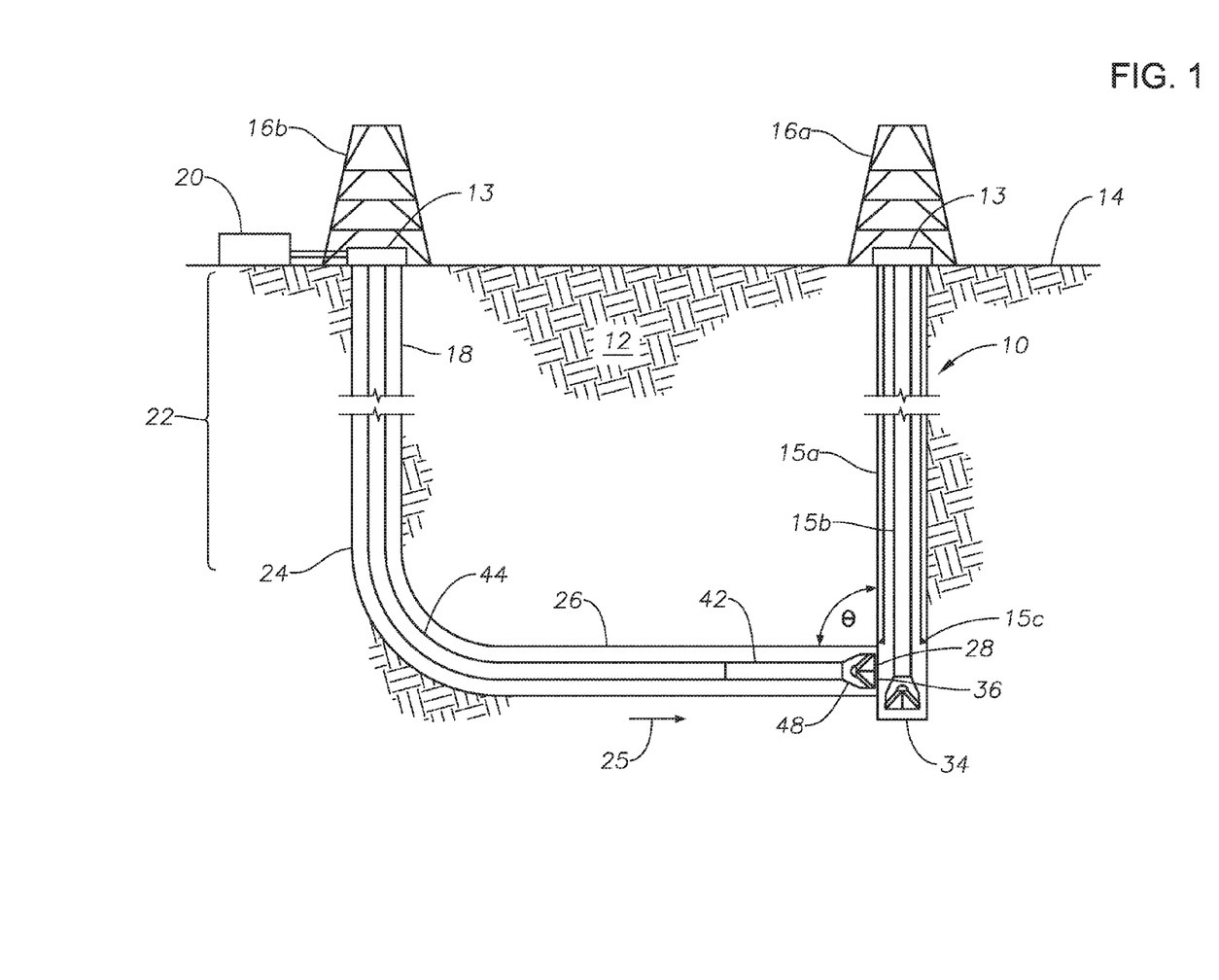
FIG. 1 shows the trajectory of a relief well intersecting a vertical portion of a target well at an angle of intercept of approximately 90 degrees according to some embodiments.

With reference to FIG. 1, a first or target wellbore 10 is shown in a formation 12 extending from a well head 13 at the surface 14. Although first wellbore 10 may have any orientation, for purposes of the discussion, first wellbore 10 is illustrated as extending substantially vertically from the surface 14. To the extent first wellbore 10 is in the process of being drilled, a drilling structure 16a may be associated with first wellbore 10. In one or more embodiments, first wellbore 10 may include a conductive body 15, such as casing 15a, a drill string 15b, a casing shoe 15c or other metal component, composite or similar type tubulars. Well head 13 may generally include one or more of blow out preventers, chokes, valves, annular and ram blowout preventers, etc.

A second or relief wellbore 18 is also shown in the formation 12 extending from a well head 13 associated with a drilling structure 16b. Drilling structure 16b may be the same or a different drilling structure from drilling structure 16a. Drilling structures 16a, 16b are for illustrative purposes only and may be any type of drilling structure utilized to drill a wellbore, including land deployed drilling structures or marine deployed drilling structures. In this regard, the wellbores may extend from land or may be formed at the bottom of a body of water (not shown). In the illustrated embodiment, first wellbore 10 includes a distal or terminus end 34 and second wellbore 18 includes a distal or terminus end 36. Also illustrated is a fluid source 20 for fluid introduced into second wellbore 18.

Second wellbore 18 is drilled to have a substantially vertical portion 22 extending from surface 14, a kickoff point 24 and a deviated portion 26 extending from the kickoff point 24 along a select trajectory 25. In FIG. 1, the deviated portion 26 is substantially horizontal. The trajectory 25 of this deviated portion 26 is selected to intersect the first wellbore 10 at an intersection point 28 so as to form an angle θ between the first wellbore 10 and the second wellbore 18. In one or more embodiments, angle θ is approximately 90 degrees as shown in FIG. 1, such that deviated portion 26 is substantially horizontal and second wellbore 18 is substantially J-shaped. While the illustrated embodiment of FIG. 1 is substantially j-shaped, i.e., θ is approximately 90 degrees, in one or more embodiments, angle θ is greater than 45 degrees. In one or more embodiments, angle θ is greater than 90 degrees. In one or more embodiments, angle θ is between 90 and 180 degrees. In one or more embodiments (as discussed with respect to FIG. 2), angle θ is approximately 180 degrees, such that the relief well approaches the intersection point 28 from below.

The second or relief wellbore 18 may be constructed using conventional directional drilling techniques, or may incorporate medium, short or ultra-short radius methods. FIG. 1 generally illustrates a drill string 44 used to drill second wellbore 18. Drill string 44 may include a bottom hole assembly 42 having a drill bit 48, as discussed in more detail below. The first wellbore 10 may be open hole or include a casing string or liner. Likewise, the second wellbore 18 may be open hole or include a casing string or liner. In one or more embodiments, the second wellbore 18 is drilled and cased to an equivalent true vertical depth ("TVD") as the first wellbore 10, left open hole, or cased off higher than the first wellbore 10. The selection of a particular arrangement, i.e., a relief well drilled from below the intersection point 28 or a relief well with an angle θ is greater than 45 or 90 degrees or a relief well with an obtuse angle θ, is based on whichever intercepting wellpath design is decided upon with the maximum dogleg allowable, based on factors particular to the relief well being drilled, such as, among other things, predicted torque and drag, available surface weight, BHA design, casing wear, drillstring buckling and cuttings removal to consider, all of which are exacerbated by high doglegs.

The intersection point 28 may therefore be in open hole or through a cased portion of first wellbore 10, where casing herein is understood to include or comprise any and all tubular members; a conduit, a pipe, a casing string, a liner, a slotted liner, coiled tubing, sand screens or the like. Fluid communication between the two wellbores 10, 18 is established at the intersection point 28. In one or more embodiments, the conductive body 15, such as casing 15a, a drill string 15b, a casing shoe 15c is adjacent the intersection point 28, and utilized to guide second wellbore 18 to the intersection point 28. For example, as shown in FIG. 1, the intersection point 28 is adjacent casing shoe 15c. In this particular illustration, alternatively, second wellbore 18 may be drilled so that intersection point 28 is adjacent the drill string 15b, and in particular, the bottom hole assembly ("BHA") on the distal end of drill string 15b.

In one or more embodiments, it is desirable to select a location for drilling structure 16b that is spaced apart from the location of drilling structure 16a even though intersection point 28 may be at a relatively shallow depth. For example, under certain conditions, it may be necessary to locate the second drilling structure 16b from the first drilling structure 16a a minimum distance in order to ensure the safety of second drilling structure 16b. The methods and techniques as disclosed herein allow the drilling structures 16a, 16b to be spaced apart from one another as necessary or desired, while at the same time intersecting the wells at a shallow TVD.

Figure 2:
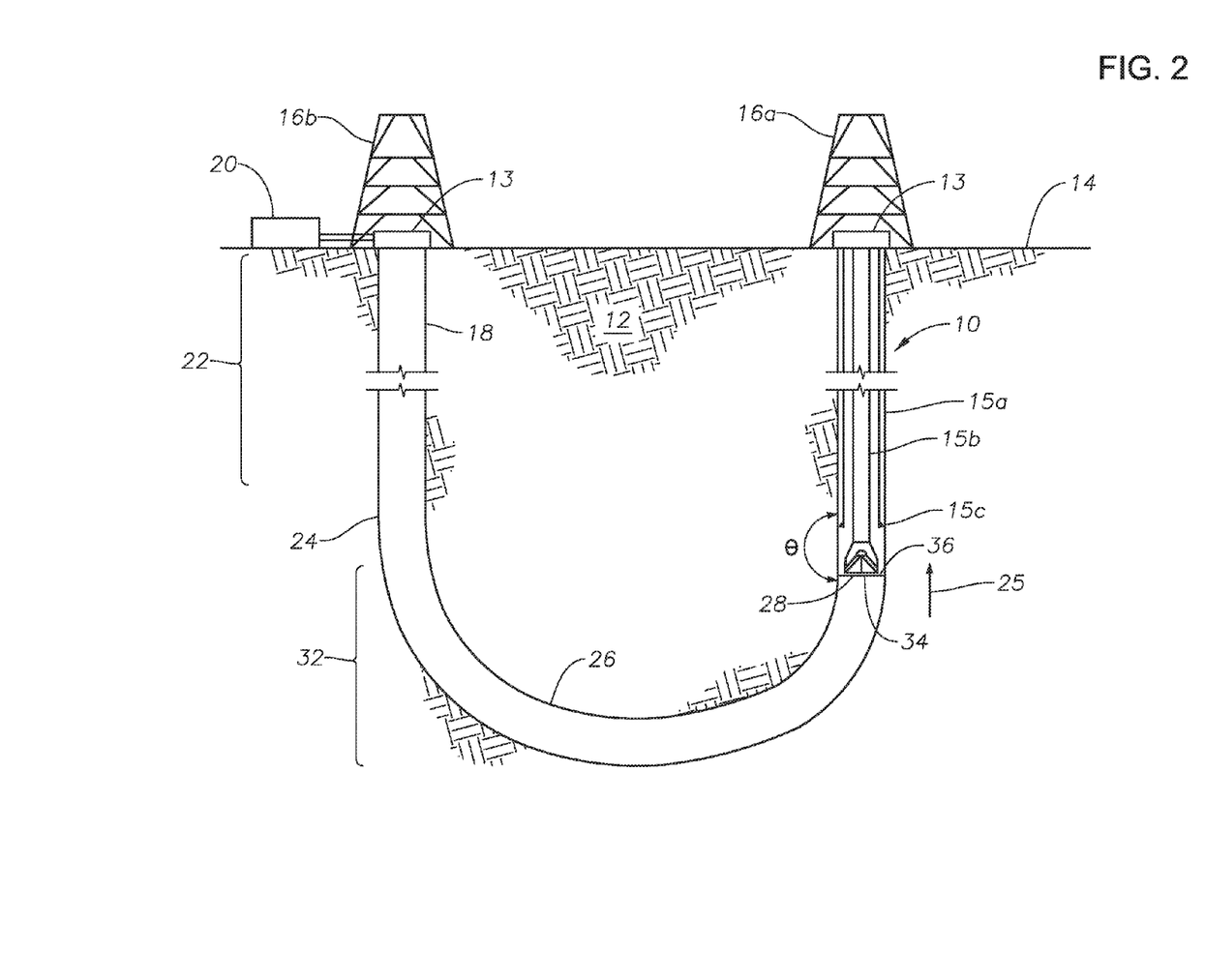
FIG. 2 shows the trajectory of a relief well intersecting a vertical portion of a target well from below the vertical target well according to some embodiments.

Turning to FIG. 2, second wellbore 18 is illustrated intersecting first wellbore 10 from below first wellbore 10, wherein the trajectory 25 of second wellbore 18 as it approaches intersection point 28 is from below the intersection point 28. Second wellbore 18 is drilled to have a substantially vertical portion 22 extending from surface 14 and a kickoff point 24. In one or more embodiments, kickoff point 24 is above intersection point 28 (such as shown in FIG. 1), while in other embodiments, kickoff point 24 is below the intersection point 28. In either case, second wellbore 18 includes a deviated portion 26 that extends from kickoff point 24 along a select trajectory 25. The deviated portion 26 is drilled along trajectory 25 to intersect first wellbore 10 at intersection point 28. In either case, a length 32 of second wellbore 18 extends below first wellbore 10. In one or more embodiments, length 32 may include all of deviated portion 26.

In the illustrated embodiment, first wellbore 10 includes a distal or terminus end 34 and second wellbore 18 includes a distal or terminus end 36. The distal end 34 of first wellbore is adjacent a conductive body 15. In the illustrated embodiment, the conductive body 15 could be either a casing shoe 15c at the end of the cased portion of first wellbore 10 or a BHA on the end of drill string 15b. For example, if the intersection point 28 were selected to be in an open-hole portion of first wellbore 10, then conductive body 15 would most likely be the BHA on the end of drill string 15b, whereas if the intersection point 28 were selected to be in a cased portion of the first wellbore 10, then the conductive body 15 most likely would be casing shoe 15c. In any event, second wellbore 18 is drilled so that the intersection point 28 is at the first wellbore terminus end 34. The casing shoe 15c or BHA of the drill string 15b (to the extent present) is utilized to guide second wellbore 18 to intersection point 28. In one or more preferred embodiments, second wellbore 18 is drilled along a trajectory 25 that approaches terminus end 36 at a deviation angle or angle of intercept θ of approximately 180 degrees. In such embodiments, at least the second wellbore terminus end 36 is aligned with the first wellbore terminus end 34 so that the respective axis' of the two wellbores are parallel at their respective ends 34, 36. In one or more embodiments, the respective axes of the two wellbores are coaxial at their respective ends 34, 36, although the wellbores need not be of the same diameter. In one or more embodiments, angle θ is approximately 180 degrees as shown in FIG. 2 and kickoff point 24 and intersection point 28 are at approximately the same TVD such that second wellbore 18 is substantially U-shaped. In any event, fluid communication between the two wellbores is established at the intersection point 28.

Figure 3:
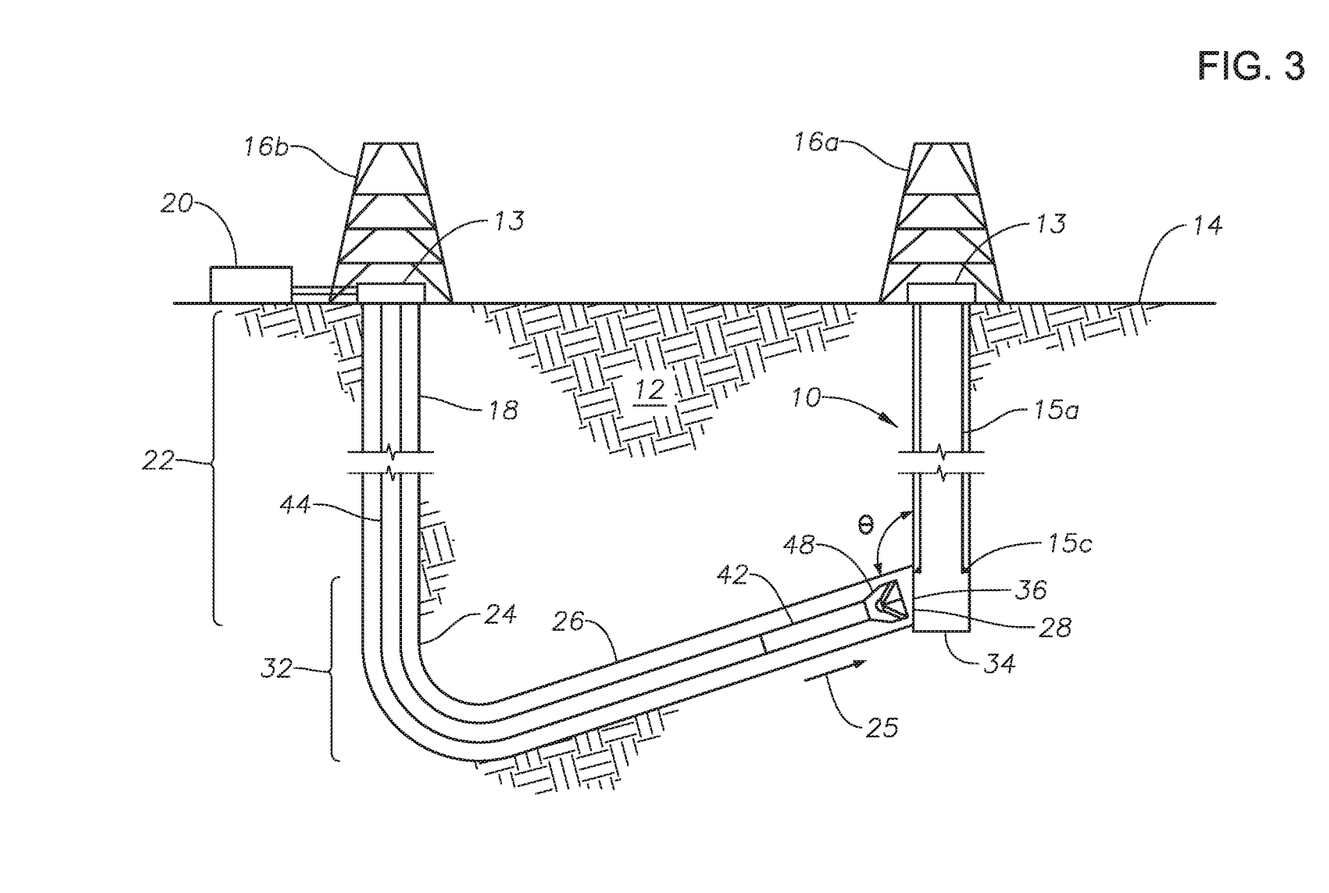
FIG. 3 shows the trajectory of a relief well intersecting a vertical portion of a target well from below the intersection point according to some embodiments.

FIG. 3 illustrates one or more embodiments where the deviation angle θ between first wellbore 10 and second wellbore 18 is obtuse, although not necessarily 180 degrees as shown in FIG. 2.

In FIG. 3, the deviated portion 26 of second wellbore 18 drops below the intersection point 28 with first wellbore 10, and in some embodiments, drops below at least a portion of first wellbore 10. The trajectory 25 of second wellbore 18 is such that second wellbore 18 still approaches first wellbore 10 from an angle greater than 90 degrees. In this regard, at least the end 36 of deviated portion 26 has a trajectory 25 that angles upward toward surface 14. In FIG. 3, the second wellbore 18 is drilled to intersect with the first wellbore 10 adjacent the casing shoe 15c located at the distal end 34 of first wellbore 10.

Figure 4:
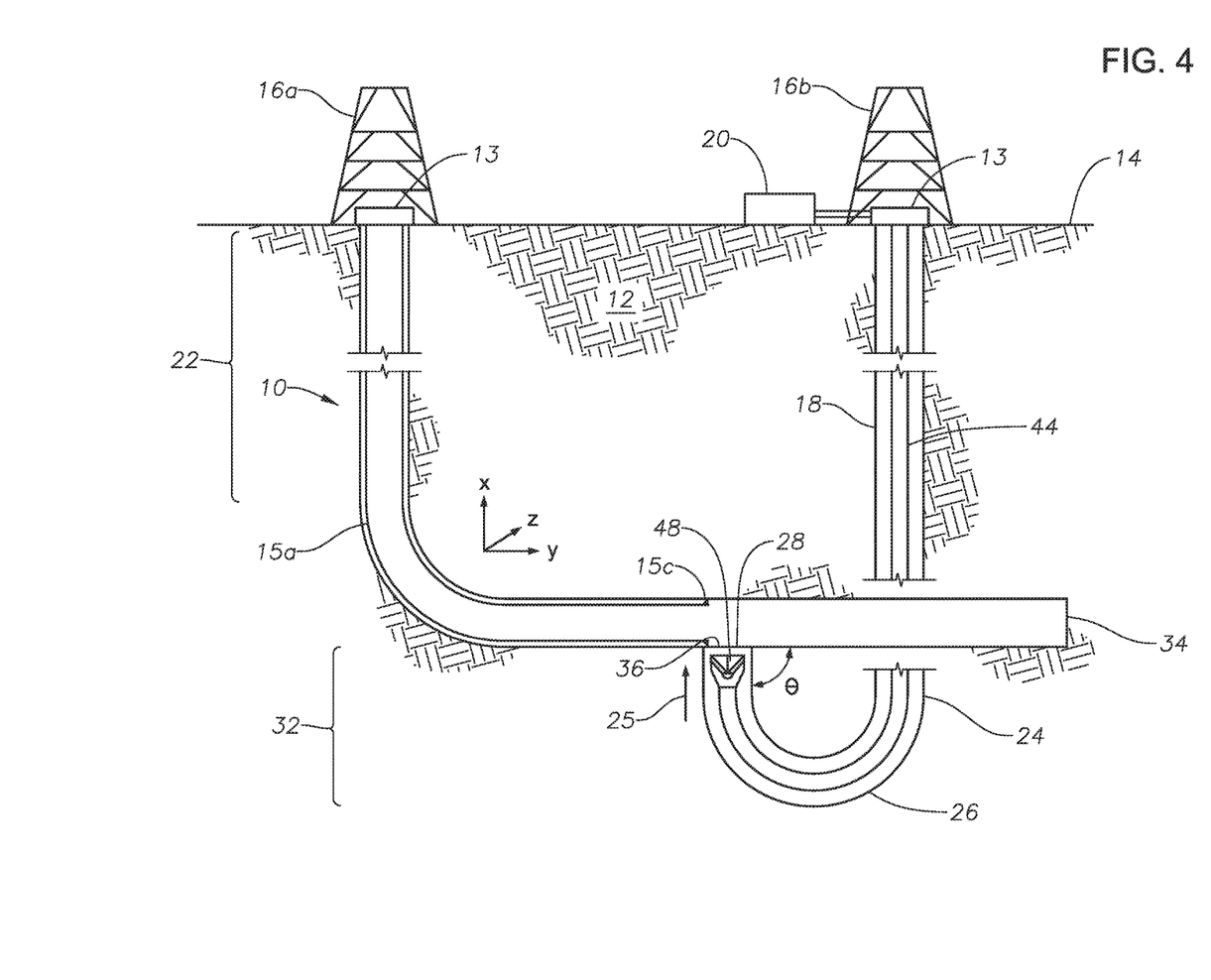
FIG. 4 shows the trajectory of a relief well intersecting a horizontal portion of a target well along a trajectory that is perpendicular to the horizontal portion of the target well according to some embodiments.

Each of the FIGS. 1-3 illustrates a first wellbore 10 that is substantially vertical. FIG. 4 however, illustrates one or more embodiments where at least a portion of first wellbore 10 is deviated and the intersection point 28 is defined along this deviated portion of first wellbore 10. Again, however, the intersection point 28 is selected to be adjacent a conductive body 15 within first wellbore 10. In the illustrated embodiment, conductive body 15 is a casing shoe 15c. In this embodiment, second wellbore 18 is illustrated intersecting first wellbore 10 from below first wellbore 10, wherein the trajectory 25 of second wellbore 18 as it approaches intersection point 28 is from below the intersection point 28. Second wellbore 18 is drilled to have a substantially vertical portion 22 extending from surface 14 and a kickoff point 24. In one or more embodiments, kickoff point 24 is above intersection point 28 while in other embodiments, kickoff point 24 is below the intersection point 28 (FIG. 4). In either case, second wellbore 18 includes a deviated portion 26 that extends from kickoff point 24 along a select trajectory 25. The deviated portion 26 is drilled along trajectory 25 to intersect first wellbore 10 at intersection point 28. In either case, a length 32 of second wellbore 18 extends below first wellbore 10. In one or more embodiments, length 32 may include all of deviated portion 26.

In the embodiments of FIG. 4, the deviation angle θ between first wellbore 10 and second wellbore 18 is approximately 90 degrees. With the deviation angle θ being approximately 90 degrees, the trajectory 25 of second wellbore 18 at the point of intersection 28 is generally perpendicular to first wellbore 10 and generally angled upward towards surface 14. In these embodiments, length 32 of second wellbore 18 is substantially U-shaped.

Figure 5:
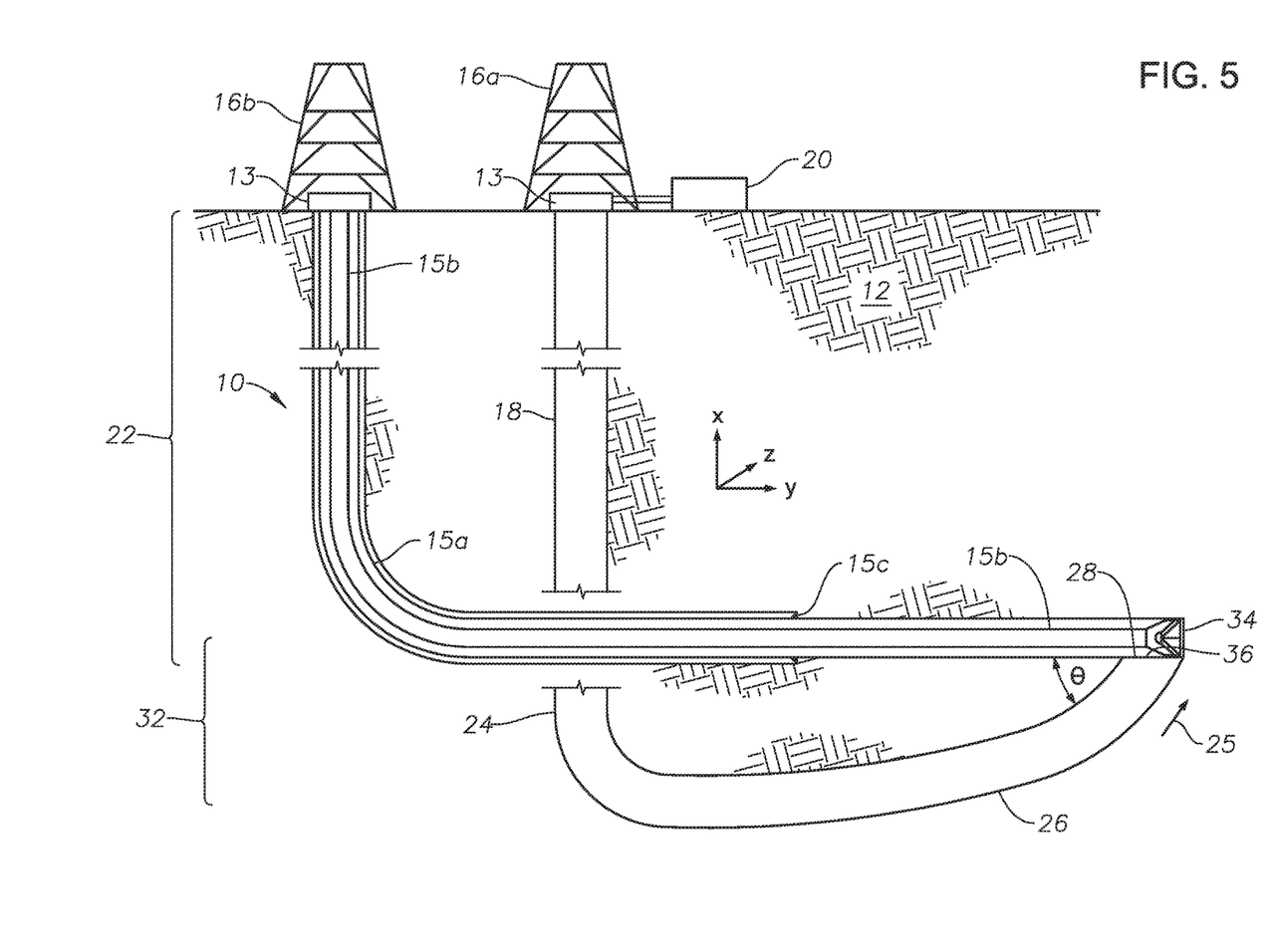
FIG. 5 shows the trajectory of a relief well intersecting a horizontal portion of a target well along a trajectory that approaches the horizontal portion of the target well from below an intersection point according to some embodiments.

Turning to FIG. 5, at least a portion of first wellbore 10 is deviated and the intersection point 28 is selected to be along this deviated portion of first wellbore 10 adjacent a conductive body 15. While casing shoe 15c could be utilized as the conductive body 15 in FIG. 5, the BHA on the end of drill string 15b is utilized in the illustrated embodiment, such that the intersection point 28 occurs in an open-hole portion of first wellbore 10. Second wellbore 18 is drilled so that at least a length 32 of second wellbore 18 is below first wellbore 10. In the illustrated embodiment, second wellbore 18 is similar to the embodiments illustrated by FIG. 4, however, in FIG. 5, the deviation angle θ between first wellbore 10 and second wellbore 18 is less than 90 degrees. In this embodiment, although deviation angle θ is less than 90 degrees, it will be appreciated that second wellbore 18 intersects first wellbore 10 from below first wellbore 10, wherein the trajectory 25 of second wellbore 18 as it approaches intersection point 28 is from below the intersection point 28. In such cases, where the intersection point 28 on a deviation portion of wellbore 10 is approached from below, the deviation angle θ may be less than 90 degrees.

It will be appreciated that in cases where a second wellbore 18 is drilled to intersect a deviated portion of a first wellbore 10, such as shown in FIGS. 4 and 5 for example, second wellbore 18 is not drilled from directly above the deviated portion of first wellbore 10, but is set off a distance Z so that second wellbore 18 will not intersect first wellbore 10 except at the desired intersection point 28, thus allowing a length 32 of second wellbore 18 to drop below the intersection point 28 on first wellbore 10 prior to intersection with first wellbore 10.

Thus, persons or ordinary skill in the art will appreciated that among the reasons for a relief well approach where the deviation angle is 90 degrees or greater are a number of factors, including but not exclusive to: the surface location of the relief well, the trajectory of the target well at the point of intercept, sub-sea or surface hazards that preclude the placing of the relief well closer to the target well, or a combination of all the factors.

Figure 6A:
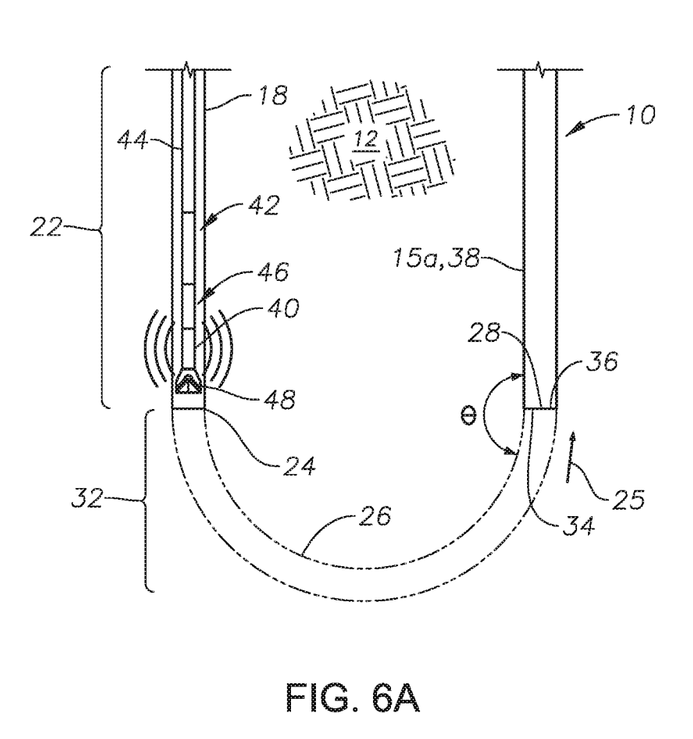
FIGS. 6A and 6B illustrate drillstring assemblies and an induced magnetic field utilized to guide a relief well to intersection with a target well according to some embodiments.
Figure 6B:
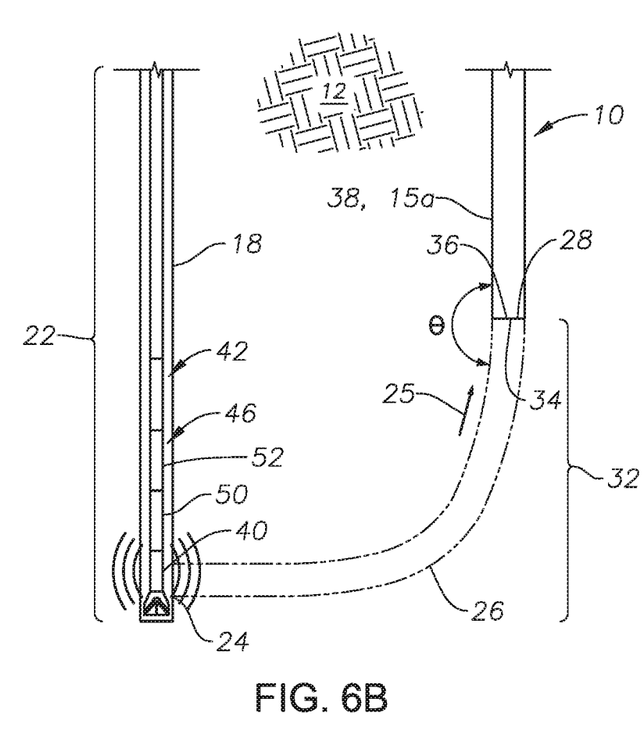

Turning to FIGS. 6A and 6B, any directional drilling and ranging techniques may be used to guide second wellbore 18 towards first wellbore 10. Although the disclosure in not limited to a particular ranging technique, in one or more preferred embodiments, magnetic ranging may be utilized. As used herein, magnetic ranging refers to any technique which uses magnetic field measurements to determine the relative position of the second wellbore 18 compared to the first wellbore 10. More specifically, magnetic ranging is employed to guide the second wellbore 18 to the desired intersection point 28 along a trajectory 25 where i) angle θ is greater than 45 degrees, ii) second wellbore 18 has a trajectory that approaches intersection point 28 from below intersection point 28, or iii) both. My utilizing magnetic ranging, the vertical portion of the second wellbore 18 can be drilled parallel to the vertical portion of the first wellbore 10 before the kick-off point 24. Thereafter, the magnetic raining system may be used to guide the distal end of the second wellbore 14 towards the distal end of the first wellbore 10. The distance between the distal ends of wellbores 10, 18 may be approximately 30 meters, for example.

The magnetic ranging methods referenced herein may be either 'passive' or 'active' techniques. In both cases the position of the second wellbore 18, i.e., the wellbore being drilled, is compared to the position of the first wellbore 10. Passive ranging methods involve the measurement of residual magnetism in wellbore 10 using a measurement device employed in second wellbore 18.

To the extent magnetic ranging is utilized, the first wellbore 10 may include a magnetic member 38 disposed therein and the second wellbore 18 may include an electromagnetic field sensor 40 disposed therein, typically as part of the bottom hole assembly 42 of a drill string 44 as shown. The measured magnetic field can then be utilized to determine distance, direction and angle between the two wellbores and alter the trajectory of the second wellbore 18 as it is being drilled. In one or more embodiments, magnetic member 38 may be a casing string section 15a utilized to line a portion of wellbore 10, or magnetic member 38 may be a tool string, such as a drill string 15b, disposed within wellbore 10 or may be a casing shoe 15c positioned at the end of a cased portion of the first wellbore 10. In one or more embodiments electromagnetic sensor 40 is a magnetometer or a magnetic gradient sensor or magnetic gradiometer. In any case, in active ranging, a current is applied to the magnetic member 38 in order to generate a magnetic field based on Ampere's Law, while in passive ranging, no such current is applied. Of course, it will be appreciated that in magnetic ranging operations, since the second wellbore 18 is essentially aimed at the first wellbore 10 based on a magnetic field from the first wellbore 10, and in particular, the magnetic member 38 of first wellbore 10, the larger magnetic member 38 or the stronger the generated magnetic field, the more accurate the intercept will be.

It will be appreciated that passive ranging techniques do not typically require access to first wellbore 10, however more accurate knowledge of the local field magnitude and direction of the earth's magnetic field is required.

Active magnetic ranging commonly involves the measurement of one or more magnetic fields created in first wellbore 10. Because the magnetic field must be created in first wellbore 10, this technique requires access in to first wellbore 10 or otherwise, in order to make magnetic field measurements from first wellbore 10. Active magnetic ranging is preferred since it is a more reliable, robust and accurate technique compared to passive magnetic ranging. However, in cases with well interception as described herein, the access required of first wellbore 10, namely the ability to create a magnetic field from first wellbore 10, is not always available. In any event, active magnetic ranging techniques tend to offer full control over the magnitude and geometry of the magnetic field or fields.

In one or more embodiments, magnetic member 38 may be a rotating magnetic or an electromagnet, such as a solenoid, capable of generating a varying magnetic field which is driven by a varying electrical signal or current to produce the fluctuating magnetic field. In such embodiments, the distal ends of the first wellbore 10 and second wellbore 18 may be spaced apart a greater distance at the kickoff point 24 than in instance where a different magnetic member 38 is utilized. Thus, for example, the distance between the distal ends of wellbores 10, 18 may be approximately 45 meters.

In one or more embodiments, magnetic member 38 may be a rare-earth source deployed in the first wellbore 10 at the desired intersection point 28, such as for example, the lower section or adjacent the distal end of the first wellbore 10.

In either case, the varying field enables the magnetic signature to be distinguished from other magnetic influences which may be present due to residual borehole magnetism or from the earth's magnetic field; the use of an alternating magnetic field, wherein the polarity of the magnetic field changes periodically, facilitates the elimination of constant magnetic field influences. The varying magnetic field may be generated in first wellbore 10, or in second wellbore 18 and may be configured so that the axis of the magnetic field is in any direction relative to the borehole, but typically either parallel or perpendicular to the borehole.

Although the disclosure in not limited to a particular directional drilling technique and steerable drilling system, the most common deviation tools for directional drilling are steerable motor assemblies and rotary steerable systems, either of which may be used in the well intersection methods described herein. FIGS. 6A and 6B illustrate a steerable drilling system 46 carried by drill string 44, preferably as part of BHA 42.

More specifically, steerable motor assemblies employ as part of a bottom hole assembly 42 a drill bit 48, a bent sub or bent housing 50 and a downhole motor (mud motor) 52 powered by drilling fluid such as mud (not shown) pumped from the surface to rotate the bit 48. The motor 52 and bit 48 are supported from a drill string 44 that extends to the well surface 14. The bent sub 50 is positioned between the power section of the motor 52 and the drill bit 48. The motor 52 rotates the bit 48 with a drive linkage (not shown) extending through the bent sub 50. To steer the bit 48, a drilling operator conventionally holds the drill string 44 from rotation and powers the motor 52 to rotate the bit 48 while the motor housing is advanced (slides) along the borehole during penetration. During this sliding operation, the bend directs the drill bit 48 away from the axis of the borehole, deflecting the bit in the desired direction to provide a slightly curved borehole section, with the curve achieving the desired deviation or build angle. When a straight or tangent section of the deviated borehole is desired, the drill string and thus the motor housing are rotated, which generally causes a slightly larger bore to be drilled along a straight path tangent to the curved section.

In one or more embodiments, steerable drilling system 46 may be a rotary steerable system (RSS). An RSS employs a deflection mechanism such as a wedge, shoe, deflector, housing or similar mechanism that tilts or applies an off-axis force to the bit in the desired direction in order to steer a directional well. In one type of RSS, the drill bit is rotated by shaft that is likewise rotated by the drill string. The shaft is surrounded by a housing. The housing typically includes a device that applies a deflection force to the shaft. By deflecting the shaft, the direction of the downhole end of the shaft, and hence the face of the drill bit, is changed. Typically when RSS techniques are employed, the entire drill string is rotated and the deflection mechanism urges the bit in a desired direction.

Figure 7:
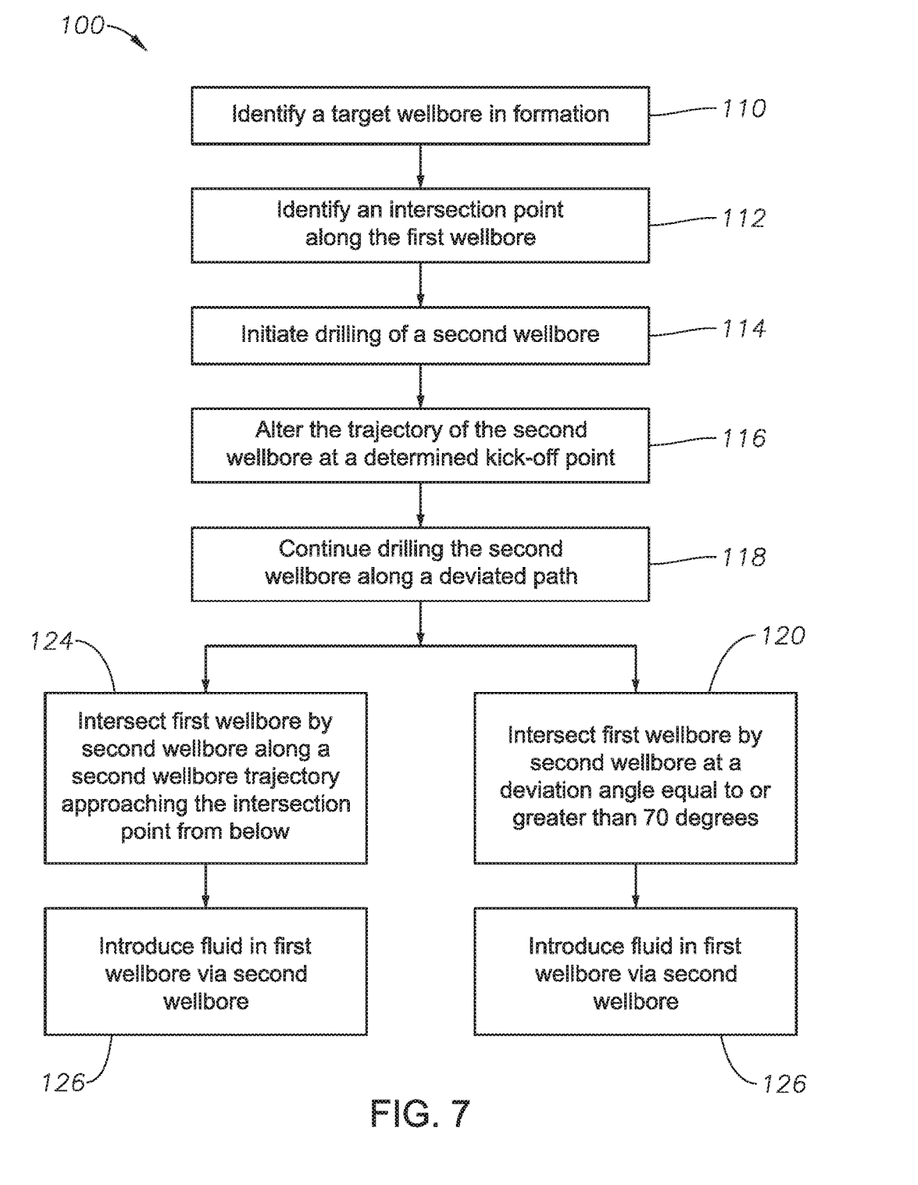
FIG. 7 shows a flow chart of a method for drilling a relief well and establishing hydraulic communication with a target well according to some embodiments.

Turning to FIG. 7, a well intervention method 100 is illustrated, whereby a first wellbore is intersected by a second wellbore to establish fluid communication therebetween. In an initial step 110, a first or target wellbore in a formation is identified. This target wellbore is an existing wellbore in a formation for which an intersection is desired in order to establish fluid communication between the first wellbore and a second wellbore, such as a relief wellbore. The first wellbore may substantially vertical along its length, or may have a deviated portion as described above. The substantially vertical wellbore, or deviated portion of the first wellbore, as the case may be, is generally characterized as being formed along a first axis.

In a next step 112, an intersection point is identified along the first axis of the first wellbore. The intersection point may be selected at a relatively shallow true vertical depth where it would be difficult or undesirable to intersect the first wellbore at such a shallow true vertical depth using prior art well intervention methods where the deviation angle was 6 degrees or less. For example, the intersection point might be selected at a true vertical depth (TVD) that does not permit appropriate spacing between the wellbores prior to intersection if traditional well intervention methods are employed. In another example, it may be desirable to locate the wellhead of the second wellbore a distance sufficiently spaced apart from the wellhead of the first wellbore to insure the safety of the wellhead of the second wellbore.

At step 114, drilling of the second wellbore in the formation is initiated. The wellhead for the second wellbore may be selected to be spaced apart from the wellhead a sufficient distance based on a particular set of circumstances, such as having a separation between wellheads dictated by minimum operating standards for a particular set of circumstances. In any event, the second wellbore is drilled so that the first portion of the second wellbore down to a determined kick-off point is substantially vertical. In one or more embodiments, the kickoff point is above the identified intersection point, while in one or more other embodiments, the kickoff point is below the identified intersection point.

Once the kick-off point is reached, in step 116, the trajectory of the second wellbore is altered, preferably in a direction towards the first wellbore. As described above, in one or more embodiments, a steerable drilling system may be utilized to alter the direction of the second wellbore. The disclosure is not limited to a particular technique or method for steering the drill bit utilized to drill the second wellbore. In one or more embodiments, the drill bit may be steered utilizing a steerable motor assembly in combination with a bent sub, while in one or more other embodiments, the drill bit may be steered utilizing a rotary steerable system.

Moreover, ranging may be utilized to guide the second wellbore towards the first wellbore, and ultimately to intersection with the first wellbore, preferably at the selected intersection point. The disclosure is not limited to a particular technique or method for ranging between the first and second wellbores. In one or more embodiments, magnetic ranging may be utilized. In this regard, magnetic ranging may be active or passive. To the extent active magnetic ranging is utilized, in one or more embodiments, a current can be applied to a magnetic member, such as casing or drill string within the first wellbore, adjacent the desired intersection point along the first wellbore, thereby resulting in a magnetic field emanating from the desired intersection point. In one or more embodiments where access to the surface is available, the current can be applied directly from the surface. In other embodiments, the current may be locally generated and applied from within the first wellbore. In still yet other embodiments, a current can be injected into the formation so as to travel to the first wellbore and along the magnetic member disposed therein in order to generate a magnetic field for ranging. In one or more embodiments, the magnetic field may be varied or fluctuated as desired. In any event, a magnetic sensor system deployed in the second wellbore may be utilized to sense the magnetic field from the first wellbore, after which any standard technique for determination of the range may be utilized to calculate distances and angles between the wellbores.

In step 118, based on the determined range and desired intersection point, the second wellbore is drilled along a deviated path or trajectory towards the intersection point. The distal end of the second wellbore is characterized by a second wellbore axis. In one or more embodiments, the deviated path, and hence the second wellbore axis, may be substantially horizontal so that the overall second wellbore forms a J or L-shape such as is illustrated in FIGS. 1 and 3, while in one or more other embodiments, the deviated path may be substantially U shaped, such as is illustrated in FIGS. 2, 3 and 4.

In step 120, the second wellbore intersects the first wellbore to establish fluid communication between the two wellbores. The intersection is at a deviation angle that is equal to or greater than 45 degrees, wherein the deviation angle is generally referred to as the angle between the first wellbore axis at the intersection point and the second wellbore axis at the distal end of the second wellbore.

In one or more embodiments, the deviation angle is approximately 90 degrees. In these embodiments, such as is illustrated in FIG. 1, the first wellbore may be a substantially vertical wellbore and the deviated portion of the second wellbore may be substantially horizontal, such that the two wellbores intersect at a substantially perpendicular orientation to one another. In one or more embodiments the intersection point along the first wellbore is selected to be spaced apart from the end of the first wellbore, such that the first wellbore extends a distance, and in some embodiments, a significant distance below the intersection point and below the lowest point of the second wellbore.

In one or more embodiments, the deviation angle is obtuse being greater than 90 degrees, while in one or more other embodiments, the obtuse deviation angle is approximately 180 degrees. It will be appreciated that in cases where the deviation angle is obtuse, the second wellbore approaches the intersection point with the first wellbore from below the intersection point. In one or more embodiments, as the obtuse deviation angle approaches 180 degrees, the second wellbore may drilled at a trajectory so that the end of the first wellbore and the end of the second wellbore are substantially axially aligned.

As an alternative to step 120 or in addition to step 120, as the case may be, at step 124, the second wellbore intersects the first wellbore to establish fluid communication between the two wellbores along a second wellbore trajectory approaching the intersection point from below, as best illustrated in FIGS. 2, 3, 4 and 5. In one or more embodiments, as is best seen in FIG. 2, the deviation angle is obtuse. In one or more embodiments, as is best seen in FIG. 4, the deviation angle is approximately 90 degrees. Finally, in one or more embodiments, as is best seen in FIG. 5, the deviation angle may be less than 90 degrees.

As a complement to step 124, in one or more embodiments, a segment of the deviated portion of the second wellbore is drilled to a TVD that is lower than at least a portion, if not all of the first wellbore. This is best illustrated in FIGS. 2, 4 and 5. The intersection point is approached by the second wellbore from below and the deviation angle, may be acute, obtuse or approximately 90, depending on the orientation of the first wellbore at the intersection point.

Finally, once the wellbores intersect one another, in step 126, a fluid can be introduced into the second wellbore and conveyed to the first wellbore for the desired purpose. In one or more embodiments, this purpose may be to prevent further hydrocarbon influx into either wellbore. Thus, for example, if the first wellbore 10 is being disabled, once fluid communication between the first wellbore 10 and second wellbore 18 is established, a cement at a predetermined density may be pumped into the second wellbore 18 and caused to flow into the first wellbore 10 by virtue of the intersection. In such operations, the choke pressure on each well may be maintained to be approximately equivalent. Thereafter, the choke may be manipulated and closed as desired to maintain and control the U-tube effect between the first and second wellbores and mitigate gas influx/microannuli formation/cement contamination with surrounding drilling fluids. Finally, once the cement has been pumped in while the wellbore pressure in each well is managed to ensure the desired flow and placement of the cement in the first wellbore 10, both chokes may be closed to maintain pressure on the cemented section while the cement sets up and creates the desired barrier.

Thus, a well intervention drilling system has been described. Embodiments of the well intervention drilling system may generally include a first wellbore formed in a formation and defined along a first axis; and a second wellbore formed in a formation and having a distal end defined along a second axis, the second wellbore intersecting the first wellbore at an intersection point, wherein the angle between the first axis and the second axis at the intersection point is greater than 45 degrees. In other embodiments, an well intervention drilling system may generally include a first wellbore formed in a formation, the first wellbore having a lateral portion defined along a first axis; and a second wellbore formed in a formation and having a distal end defined along a second axis, the second wellbore intersecting the first wellbore at an intersection point, wherein a portion of the second wellbore is formed in the formation below at least a portion of the first wellbore.

For any of the foregoing embodiments, the system may include any one of the following elements, alone or in combination with each other:

- A distal end of the second wellbore is lower than a distal end of the first wellbore.
- The angle between the first axis and the second axis at the intersection point is approximately 90 degrees.
- The first wellbore at the intersection point is substantially vertical and the second wellbore at the intersection point is a lateral wellbore.
- The lateral wellbore is substantially horizontal.
- The second wellbore has a trajectory along the second axis that approaches the intersection point from below the intersection point.
- The angle between the first axis and the second axis at the intersection point is greater than 90 degrees.
- One of the wellbores includes a magnetic member disposed therein and the other wellbore includes a magnetic sensor disposed therein.
- A well ranging system.
- A well ranging system is a magnetic well ranging system.
- The second wellbore includes a directional drilling system.
- A directional drilling system comprises rotary steerable system.
- A directional drilling system comprises a bottom hole assembly having a drill bit, a bent sub, and a mud motor disposed to rotate the drill bit.
- The second wellbore has a trajectory along the second axis that approaches the intersection point from below the intersection point.
- The second wellbore has a trajectory along the second axis that approaches the intersection point from below the first wellbore.
- One of the wellbores includes a magnetic member disposed therein and the other wellbore includes a magnetic sensor disposed therein.
- A conductive body in the first wellbore adjacent an intersection point.
- A conductive body in the first wellbore, the conductive body selected from the group consisting of a drill string, a BHA, a drill bit, casing, and a casing shoe.

Thus, a well intervention method for intersecting a first wellbore formed in a formation by a second wellbore has been described. Embodiments of the method may generally include identifying a first wellbore formed in a formation and defined along a first axis; and drilling a second wellbore in a formation along a second axis to intersect with the first wellbore at an intersection point so that the angle between the first axis and the second axis at the intersection point is greater than 45 degrees. In other embodiments, a well intervention method may generally include identifying a first wellbore formed in a formation and defined along a first axis; and drilling a second wellbore in a formation along a second axis to intersect with the first wellbore at an intersection point so that a portion of the second wellbore is formed in the formation below the first wellbore. In other embodiments, a well intervention method may generally include identifying a first wellbore formed in a formation and defined along a first axis; and drilling a second wellbore in a formation along a second axis to intersect with the first wellbore at an intersection point so that the trajectory of the second wellbore at the distal end of the second wellbore approaches the intersection point from below the intersection point.

For any of the foregoing embodiments, the well intervention method may include any one of the following, alone or in combination with each other:

- Drilling a first portion of the second wellbore along a path that is substantially vertical; at a desired kickoff point, drilling a second portion of the second wellbore along a path that is substantially horizontal; and intersecting the first wellbore with the second wellbore so that the angle between the first axis and the second axis at the intersection point is approximately 90 degrees.
- Selecting a drilling site for the second wellbore that is spaced apart from the wellhead of the first wellbore at least to the operating company's minimum standards, such as 1000 feet or more.
- Utilizing magnetic ranging to guide the second well to the intersection point.
- Generating a magnetic field from the first well and sensing the magnetic field in the second well.
- Selecting an interception point to be adjacent a conductive body in the first wellbore and drilling the second wellbore based on the conductive body.
- Selecting an interception point to be adjacent a BHA in the first wellbore and drilling the second wellbore based on the BHA.
- Selecting an interception point to be adjacent a casing shoe in the first wellbore and drilling the second wellbore based on the casing shoe.
- Adjusting the trajectory of the second wellbore based on magnetic ranging.
- Drilling the second wellbore along a substantially vertical path down to a desired kickoff point; altering the trajectory of the wellbore; and continuing to drill the second wellbore along a deviated path.
- Continuing to drill the second wellbore along a substantially horizontal deviated path.
- Comprising continuing to drill the second wellbore along a substantially U-shaped deviated path.
- Pumping a fluid into the second wellbore and causing to flow into the first wellbore.
- Managing the pressures within the first wellbore and the second wellbore in order to cause fluid to flow from the second wellbore into the first wellbore.
- Pumping cement at a predetermined density into the second wellbore; maintaining equal choke pressure on each wellbore; manipulating the chokes to maintain a desired pressure within each wellbore and to control the U-tube effect and mitigate gas influx/micro-annuli formation/cement contamination with surrounding drilling fluids; and closing both chokes to maintain pressure on the cemented section while the cement sets up and creates the desired barrier.

It should be understood by those skilled in the art that the illustrative embodiments described herein are not intended to be construed in a limiting sense. Various modifications and combinations of the illustrative embodiments as well as other embodiments will be apparent to persons skilled in the art upon reference to this disclosure. It is, therefore, intended that the appended claims encompass any such modifications or embodiments.

The invention claimed is:

1. A method for wellbore intervention, the method comprising:

identifying a first wellbore formed in a formation and having a distal end defined along a first axis at a first true vertical depth (TVD);

drilling a second wellbore in a formation to a second TVD greater than the first TVD, and subsequently along a second axis to intersect with the first wellbore at an intersection point so that the angle between the first axis and the second axis at the intersection point is greater than 90 degrees;

pumping a fluid at a predetermined density into the second wellbore to cause the fluid to flow into the first wellbore through the intersection point while maintaining an approximately equivalent choke pressure on the first and second wellbore by virtue of the intersection; and manipulating the choke pressures to move the fluid to a predetermined placement in the first wellbore.

2. The method of claim 1, further comprising, drilling a first portion of the second wellbore along a path that is substantially vertical; and at a desired kickoff point, drilling a second portion of the second wellbore along a path that is substantially horizontal.

3. The method of claim 1, further comprising selecting the intersection point to be adjacent a conductive body in the first wellbore and drilling the second wellbore based on the conductive body.

4. The method of claim 1, wherein the fluid is cement and the position in the first wellbore is selected to prevent further hydrocarbon influx into the first wellbore.

5. The method of claim 1, further comprising utilizing magnetic ranging to guide the second well to the intersection point.

6. The method of claim 1, further comprising drilling the second wellbore along a substantially vertical path down to a desired kickoff point;

altering a trajectory of the wellbore; and continuing to drill the second wellbore along a deviated path.

7. The method of claim 5, further comprising generating a magnetic field from the first well and sensing the magnetic field in the second well.

8. The method of claim 5, further comprising adjusting a trajectory of the second wellbore based on magnetic ranging.

9. The method of claim 6, further comprising continuing to drill the second wellbore along a substantially horizontal deviated path.

10. The method of claim 6, further comprising continuing to drill the second wellbore along a substantially U-shaped deviated path.

11. A well intervention drilling system comprising:

a first wellbore formed in a formation and having a distal end defined along a first axis at a first true vertical depth (TVD); and a second wellbore formed in the formation to a second TVD greater than the first TVD and having a distal end defined along a second axis, the second wellbore intersecting the first wellbore at an intersection point, wherein the angle between the first axis and the second axis at the intersection point is greater than 45 degrees; and a fluid at a predetermined density maintained wellbore and the second wellbore through the intersection point by approximately equivalent choke pressures in the first and second wellbores; and chokes operably associated with the first wellbore and the second wellbore and operable for manipulating the choke pressures to move the fluid to a predetermined placement in the first wellbore.

12. The system of claim 11, wherein the first wellbore at the intersection point is substantially vertical.

13. The system of claim 11, wherein one of the wellbores includes a magnetic member disposed therein and the other wellbore includes a magnetic sensor disposed therein.

14. The system of claim 11, further comprising a well ranging system.

15. The system of claim 14, wherein the well ranging system is a magnetic well ranging system.

16. The system of claim 11, wherein the second wellbore includes a directional drilling system.

17. The system of claim 16, wherein the directional drilling system comprises rotary steerable system.

18. The system of claim 16, wherein the directional drilling system comprises a bottom hole assembly having a drill bit, a bent sub, and a mud motor disposed to rotate the drill bit.

19. The method of claim 4, further comprising closing a choke in each of the first and second wellbores to maintain pressure on the cemented section while the cement sets up.

* * * * *

UNITED STATES PATENT AND TRADEMARK OFFICE
CERTIFICATE OF CORRECTION

PATENT NO. : 10,487,644 B2  
APPLICATION NO. : 15/502858  
DATED : November 26, 2019  
INVENTOR(S) : Joe E. Hess and Andy J. Cuthbert Page 1 of 1

It is certified that error appears in the above-identified patent and that said Letters Patent is hereby corrected as shown below:

Column 14 In Claim 11, Line 17: insert --in the first-- after "maintained".

Signed and Sealed this  
Seventeenth Day of March, 2020

Andrei Iancu  
*Director of the United States Patent and Trademark Office*